United States Patent [19]

Tucker et al.

[11] Patent Number: 4,662,752
[45] Date of Patent: May 5, 1987

[54] POSITION AND ORIENTATION (POSE) SENSOR AND RELATED METHOD

[75] Inventors: Michael Tucker, Bethlehem; Noel D. Perriera, Allentown, both of Pa.

[73] Assignee: Actel Partnership, Arlington, Tex.

[21] Appl. No.: 794,798

[22] Filed: Nov. 4, 1985

[51] Int. Cl.⁴ .............................................. G01B 11/14
[52] U.S. Cl. ........................................ 356/375; 901/47
[58] Field of Search ........................ 356/1, 152, 375; 901/47

[56] References Cited

U.S. PATENT DOCUMENTS 4,396,945  8/1983  DiMatteo et al. ................... 356/375
4,582,430  4/1986  Price .................................... 356/375

Primary Examiner—Eugene R. LaRoche
Assistant Examiner—David Mis

[57] ABSTRACT

A sensor for measuring the position and orientation (POSE) of an object and related method involving the utilization of a target affixed to an object and including three mutually perpendicular intersecting planar surfaces, a base, a mechanism coupled to that base for directing a pair of light beams onto each of the planar surfaces, and an additional mechanism coupled to the base for detecting the reflection positions of the resultant reflections of each of the light beams, the reflection positions thereby being available to determine the POSE of the target relative to the POSE of the base.

13 Claims, 19 Drawing Figures

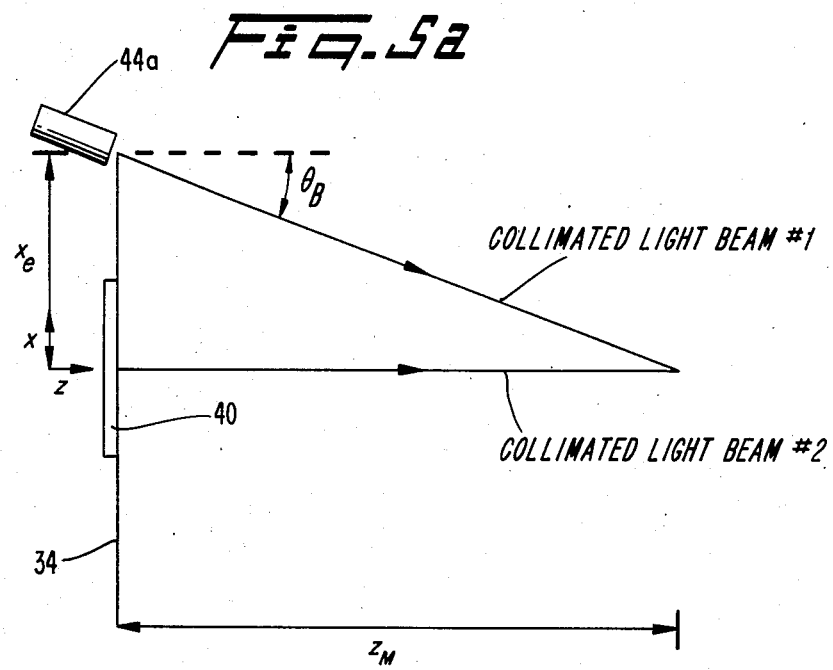
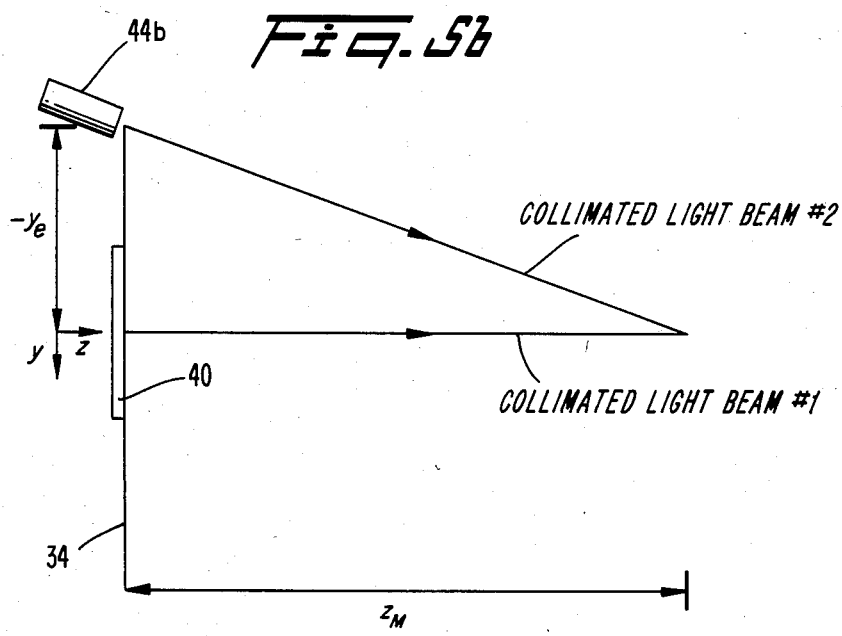

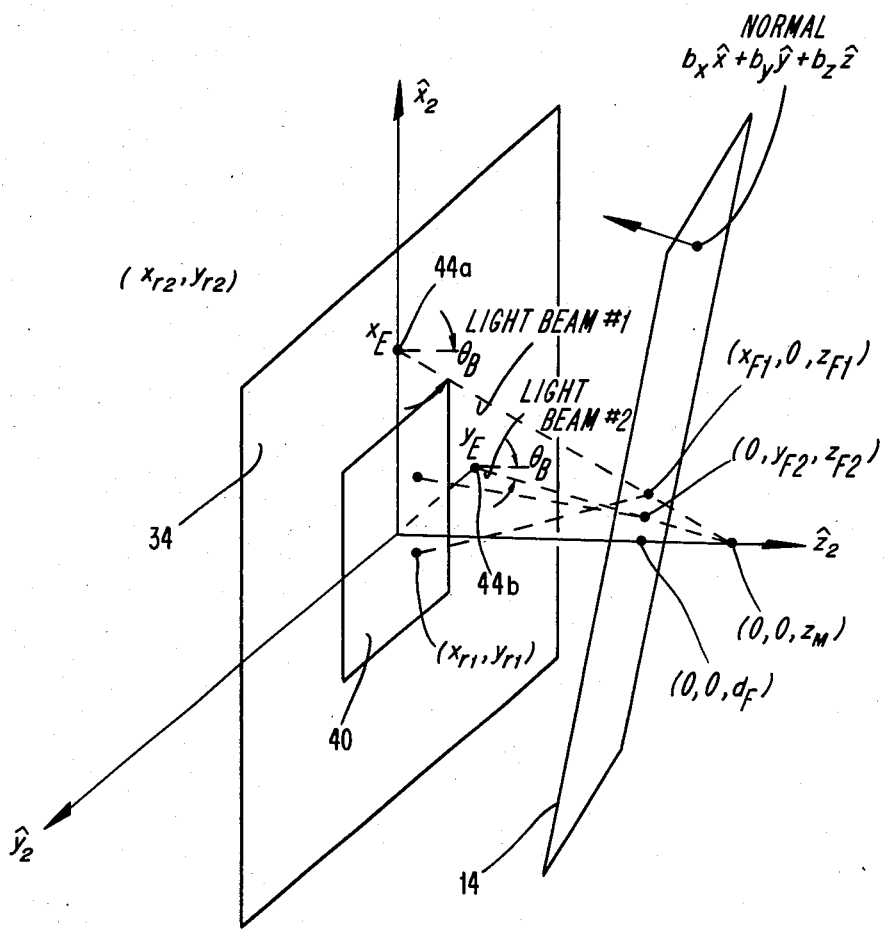

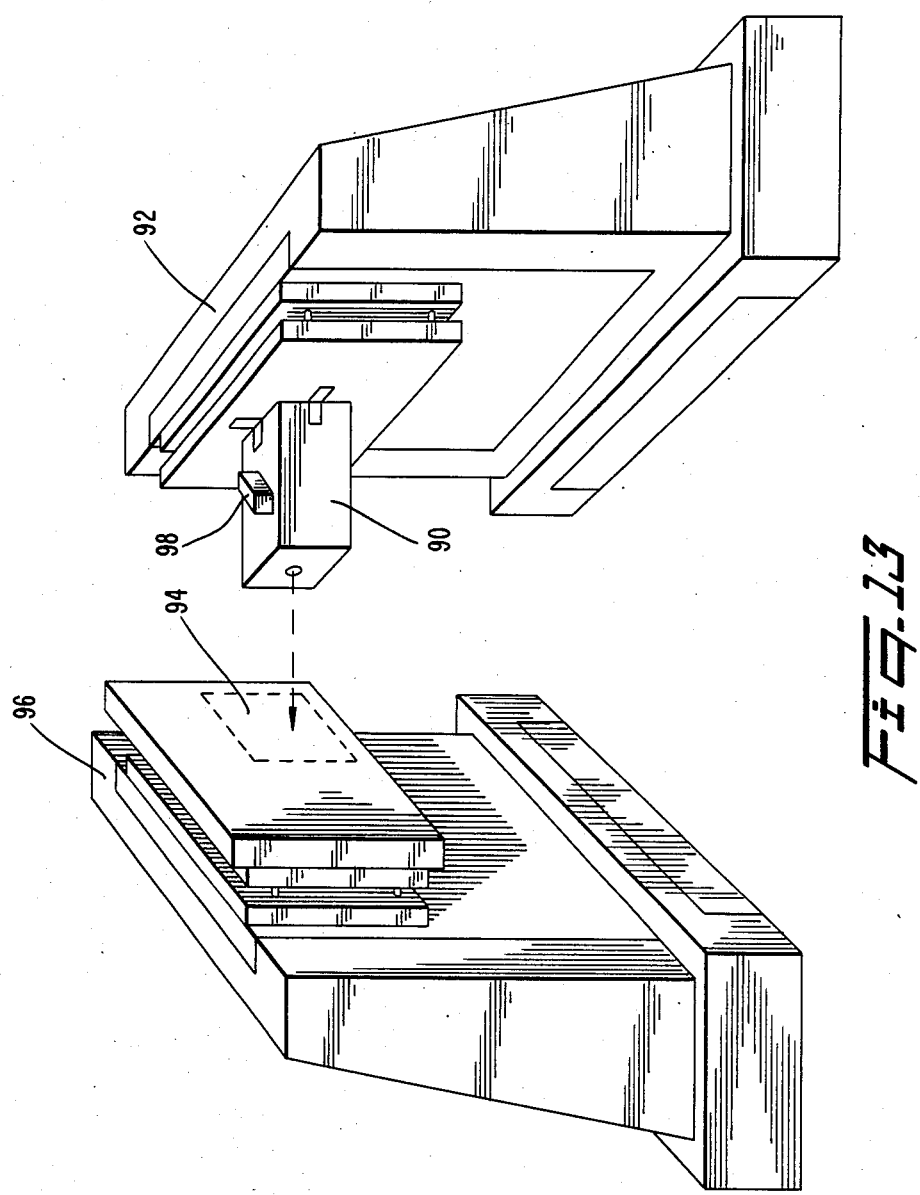

POSITION AND ORIENTATION (POSE) SENSOR AND RELATED METHOD

BACKGROUND OF THE INVENTION

I. Field of the Invention

The present invention relates to a sensor and related method for measuring the position and orientation (POSE) of an object.

II. Background Information

To measure the actual POSE of robotic and effectors and the like, various sensors have been proposed. For example, one proposed sensor contemplates the utilization of a target cube positioned on the end effector of a robot. The target cube is used in connection with a hollowed-out tube detector which contains in each wall thereof a trio of contact dial gauges. The robot end effector target cube is moved into contact with the gauges in the interior of the hollow cube detector. Upon contact with the gauges, the actual position and orientation (POSE) of the target cube may be calculated from the output of the gauges and compared against the expected position of the target cube.

Such prior art sensors suffer from the obvious defect of requiring physical contact between a target cube on the end effector and the detector cube. Such contact may actually alter the position of the end effector and thereby introduce error into the resultant POSE measurements.

Non-contact optical sensing systems have been developed to determine position but not both position and orientation. Thus, such optical systems can determine where the end effector of a robotic device is, but cannot determine the orientation of that and effector and, hence, can provide only limited information upon which robotic performance may be improved.

Non-contact sensing devices employing eddy current detection are also known. However, like the known optical systems, such eddy current systems can only measure the position of the face of a target cube and then, can only measure that position if surfaces of the target cube are oriented approximately parallel to the surfaces of the detector cube in which the eddy current device is mounted. Accordingly, such systems have severe limitations in that if the target cube was not moved accurately into the detector cube in an approximately parallel orientation, substantial error is incurred in the resultant position measurement.

It is, accordingly, a primary object of the subject invention to provide a non-contact sensor which accurately measures both the position and orientation of an object, such as the end effector of a robotic device.

A further object of the subject invention is to provide such a sensor which does not require any electronic parts to be mounted on the object to be measured and, therefore, causes no loading to the object and eliminates the need to provide an electrical interface to the object.

A further object of the subject invention is to provide a sensor which measures all six degrees of freedom of a standard commercial manipulator and effector with substantial accuracy and range of measurement in a relatively inexpensive manner.

Additional objects and advantages of the invention will be set forth in the description which follows and will, in part, be obvious from the description or may be learned by practice of the invention.

SUMMARY OF THE INVENTION

To achieve the foregoing objects, and in accordance with the purposes of the invention as embodied and broadly described herein, a sensor for measuring the position and orientation (POSE) of an object relative to the POSE of a base is provided which comprises: a target fixed to either the object or base and including three manually intersecting planar surfaces; means, coupled to the other of the object and base, for directing a pair of light beams onto each of the three planar surfaces; and means, coupled to the other of the object and base, for detecting the reflection position of the resultant reflections of each of the light beams, the reflection positions thereby being available to determine the POSE of the object relative to the POSE of the base.

Preferably the subject sensor further includes the actual means for determining the POSE of the target as a function of the reflection positions. It is also preferable that the planes of the target be mutually perpendicular to each other and that the means for detecting include an additional three mutually perpendicular planar surfaces and a two-dimensional light sensitive position detector located on the inside facing surfaces of each of the additional planar surfaces.

It is still further preferable that the means for detecting comprise three pair of light sources, with one pair mounted on each of the inside facing surfaces of each of the additional planar surfaces. The light sources of each of the pair are preferably positioned on axes in the inside-facing surfaces orthogonal to each other and which have their origin at the center of the corresponding detector.

The subject invention further contemplates a corresponding method comprising the steps of shining two light beams onto each of three mutually intersecting reflective planes fixed to either the object or the base; detecting the resultant reflection positions of the light beams; and calculating the POSE of the object as a function of the reflection positions. This method preferably includes the additional step of utilizing the outputs of a plurality of light sensitive position detectors during the step of detecting.

The method of the subject invention also preferably includes the additional steps of calibrating the light sensitive position detectors, prior to the step of utilizing, by shining beams of light onto the detectors at known positions and thereby detecting error signals and by modifying the outputs of the light sensitive position detectors during the step of utilizing those detectors as a function of the error signals.

It is still further preferable that the method of the subject invention include the additional steps of measuring the actual alignment of the light beams, prior to the step of detecting, by measuring the actual POSE of the intersecting reflective planes by utilizing a coordinate measuring technique; measuring the actual reflection positions of the light beams with the reflective planes in the measured POSE; determining the expected reflection positions of the light beams with the reflective planes in the measured POSE; calculating the difference between the actual position and alignment of the light beams and the expected position and alignment of the light beams as a function of the difference between the actual reflection positions and the expected reflection positions and adjusting the results of the step of calculating as a function of the difference between the actual position and alignment of the light beams and the expected position and alignment of the light beams.

BRIEF DESCRIPTION OF THE DRAWINGS

FIG. 5a is a side view of the detector of FIG. 3 taken along line $V_a$—$V_a$;

FIG. 5b is a top view of the detector of FIG. 3 taken along line $V_b$—$V_b$;

FIG. 6 is a perspective view of one planar surface of the detector of FIG. 3;

FIG. 13 illustrates a calibration set up for the sensor of the subject invention;

DESCRIPTION OF THE PREFERRED EMBODIMENT

Reference will now be made in detail to the present preferred embodiment of the invention as illustrated in the accompanying drawings.

Figure 1:
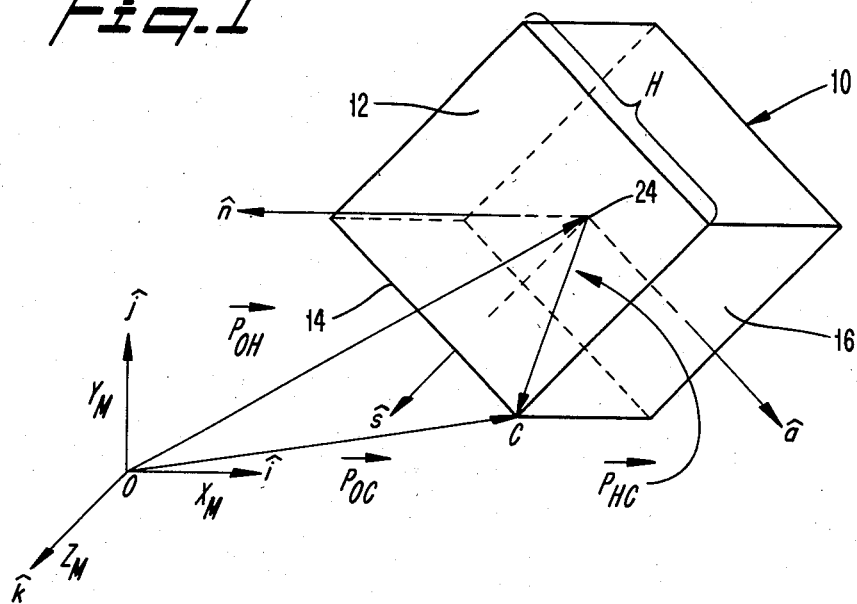
FIG. 1 discloses the relationship between a target cube employed in accordance with the teachings of the subject invention and a base coordinate system.

In FIG. 1 there is illustrated a target in the form of a cube 10 which includes three mutually intersecting planar surfaces 12, 14 and 16 which are mutually perpendicular to one another. As illustrated in FIG. 1, target cube 10 has a plurality of edges, each of which has a length H. Target cube 10 also has a corner C which is the intersection of planar surfaces 12, 14 and 16.

Cube 10 preferably is on the order of 4×4×4 centimeters, with surfaces 12, 14 and 16 being highly reflective and smooth. Cube 10 may either be mounted on a specifically dedicated end effector or can be part of a robot's general end effector. Although it is preferable that the target of the subject invention be arranged in the form of a cube, it should be understood that all that is required in accordance with the generic concepts of the subject invention is a target which consists of three intersecting reflective planes. These planes need not be mutually perpendicular. Also the surfaces can be arranged in a concave manner rather then the convex arrangement in FIG. 1.

Figure 2:
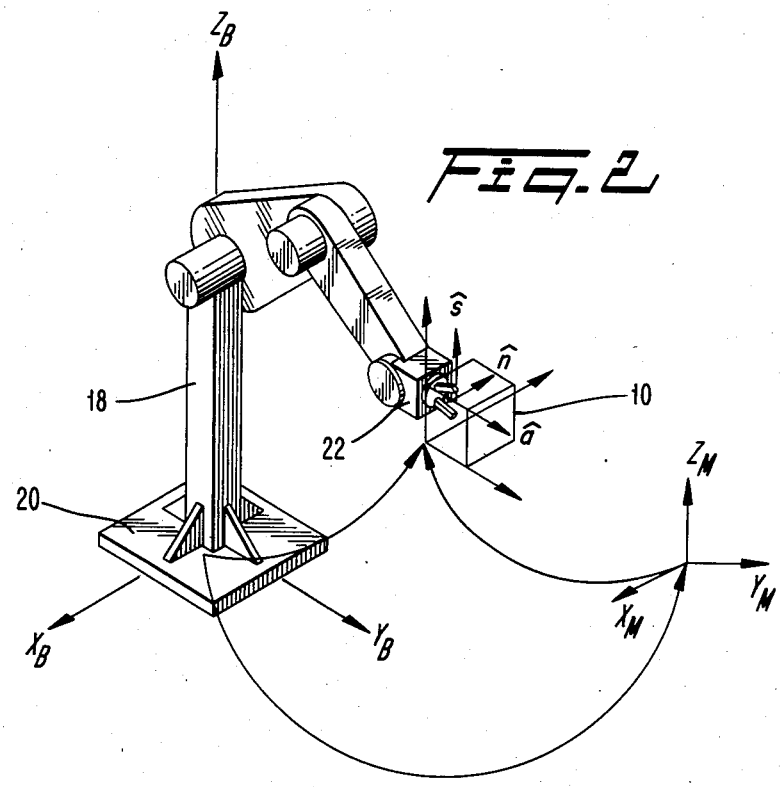
FIG. 2 illustrates a robotic hand fixture whose POSE is to be measured in accordance with the teachings of the present invention.

FIG. 1 also illustrates a first base coordinate system $(X_M, Y_M, Z_M)$ which preferably is fixed in position and orientation with regard to the detector base fixture. The frame $(X_M, Y_M, Z_M)$ can be in an unknown position and orientation relative to the robot base. For example, in FIG. 2 there is illustrated a robotic device 18 having a base 20 aligned with a second base coordinate system $(X_B, Y_B, Z_B)$. There is also illustrated in FIG. 2 a detector base coordinate system $(X_M, Y_M, Z_M)$ which is positioned and oriented in a fixed or unknown relationship with regard to base coordinate system $(X_B, Y_B, Z_B)$. As will be discussed in more detail below, the detector base coordinate system $(X_M, Y_M, Z_M)$ is preferably positioned and oriented within a detector fixture which incorporates the teachings of the present invention.

There is also illustrated in FIG. 2 a hand fixture 22 of robotic device 18 which has fixed upon it target cube 10 from FIG. 1.

It is an object of the present invention to provide a sensor which accurately and effectively, and without contact, permits measurement of the position and orientation of target cube 10 and, hence, hand fixture 22, with regard to the detector base coordinate system $(X_M, Y_M, Z_M)$.

Returning to FIG. 1, the position and orientation of cube 10 with regard to coordinate system $(X_M, Y_M, Z_M)$ may be defined in many different ways. By way of example and not limitation, the position of target cube 10 will be defined hereinafter by the location of point C of cube 10 in coordinate system $(X_M, Y_M, Z_M)$. As used hereinafter, the particular position of corner C of target cube 10 will be designated $(_cX_M, _cY_M, _cZ_M)$. Of course, obtaining the values $(_cX_M, _cY_M, _cZ_M)$ with regard to coordinate system $(X_M, Y_M, Z_M)$ merely locates the position of corner C, but in no way defines the orientation of cube 10 about corner C. Such orientation of cube 10 about corner C may be defined using a variety of different techniques. By way of illustration and not limitation, the orientation of cube 10 will be defined hereinafter by three vectors n, s, and â. Each of vectors n, s, and â are unit vectors normal to planar surfaces 12, 14 and 16, respectively. Thus, the orientation of vectors n, s and â and, hence, the orientation of cube 10 may be defined by the direction cosines $b_{x1}, b_{y1}, b_{z1}$ for surface 12; $b_{x2}, b_{y2}, b_{z2}$ for surface 14; and $b_{x3}, b_{y3}$ and $b_{z3}$ for surface 16.

In accordance with the present invention, a target including three mutually intersecting planar surfaces, such as cube 10 illustrated in FIG. 1, is fixed to the object whose POSE is to be measured. Furthermore, in accordance with the present invention, there is provided a base and means coupled to that base for directing a pair of intersecting light beams onto each of the planar surfaces of the target.

Figure 3:
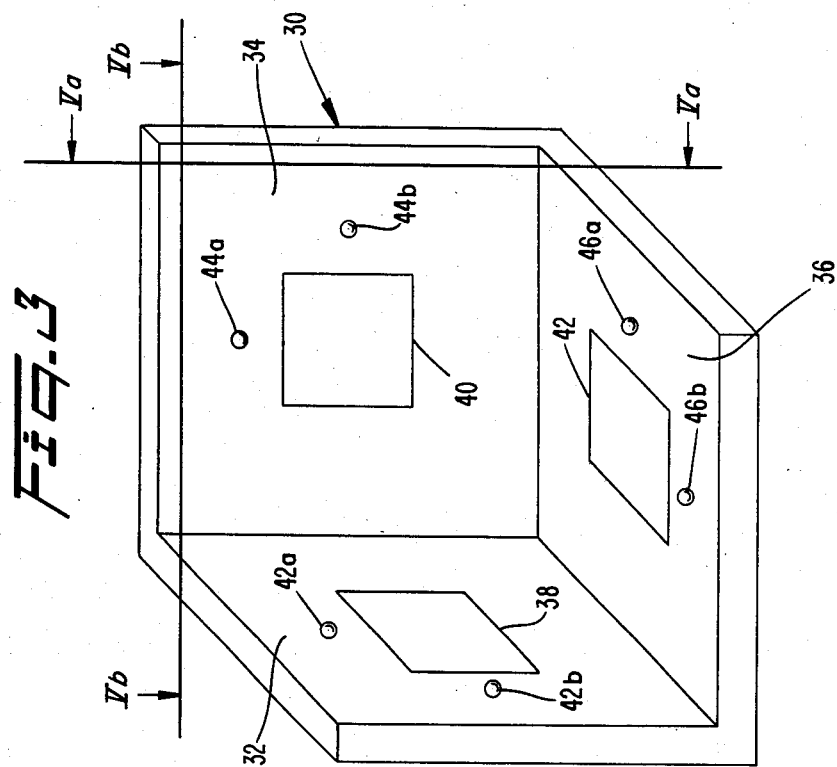
FIG. 3 illustrates a detector fixture incorporating the teachings of the subject invention.

As illustrated in FIG. 3, there is shown a detector fixture 30 which may be mounted at a fixed or unknown position and orientation relative to base 20 of FIG. 2 and which includes three additional mutually perpendicular planar surfaces 32, 34 and 36, a two-dimensional light position sensitive detector 38, 40 and 42 located on the inside-facing surface of each planar surface 32, 34 and 36, respectively, and three pair of light sources 42a, 42b, 44a, 44b, and 46a, 46b, with one pair of light sources 42a, 42b mounted on the inside-facing surface of planar surface 32, one pair of light sources 44a, 44b mounted on the inside-facing surface of planar surface 34, and one pair of light sources 46a, 46b mounted on the inside-facing surface of planar surface 36. As will be discussed in more detail below, each of light source pairs 42a, 42b, 44a, 44b, and 46a, 46b are aligned so as to direct a pair of intersecting light beams onto a respective planar surface 12, 14 and 16 of cube 10 (FIG. 1) as cube 10 is moved into proximity with detector fixture 30. Furthermore, as will be described in more detail below, position detectors 38, 40 and 42 detect the reflection positions of each of the light beams from sources 42a, 42b, 44a, 44b, and 46a, 46b and these reflection positions are available to determine the POSE of cube 10 relative to the POSE of detector 30 and, hence, relative to the POSE of the detector base coordinate system $(X_M, Y_M, Z_M)$.

Figure 4:
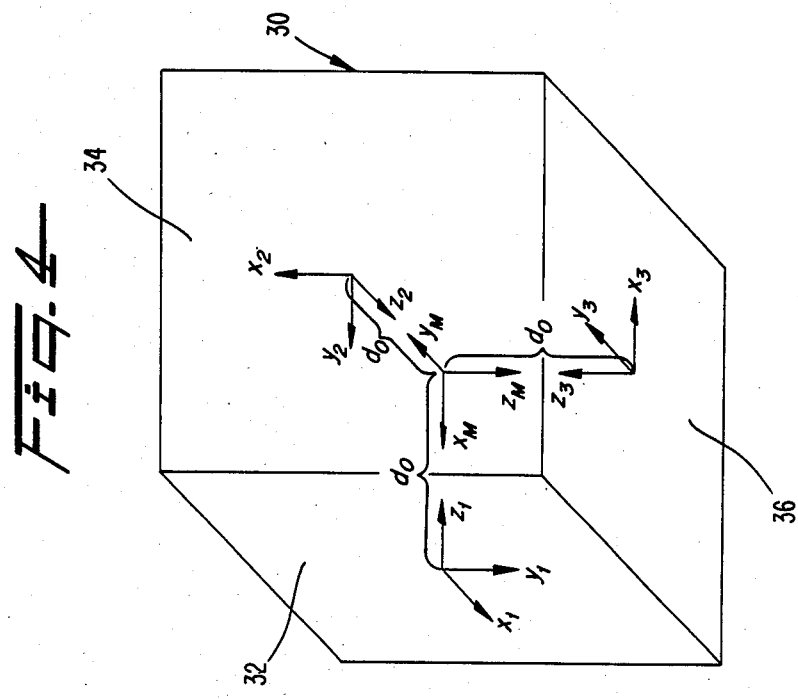
FIG. 4 illustrates the relationship between the POSE of mutually intersecting surfaces employed in the detector of FIG. 3 and the base coordinate system illustrated in FIGS. 1 and 2.

In order to explain how the detection of the reflection points by position detectors 38, 40 and 42 may be utilized to determine the POSE of cube 10, the basic relationships between planar surfaces 32, 34 and 36 and coordinate system $(X_M, Y_M, Z_M)$ must first be defined. In this regard, attention is directed toward FIG. 4 wherein the base coordinate system $(X_M, Y_M, Z_M)$ of FIGS. 1 and 2 is illustrated as being positioned within the interior of the hollow detector cube defined by the inside surfaces of planar surfaces 32, 34 and 36 of detector fixture 30. As shown in FIG. 4, each surface 32, 34 and 36 has $(x_i, y_i, z_i)$ coordinate system. Each of coordinate systems $(x_i, y_i, z_i)$ are orthogonal to base coordinate system $(X_M, Y_M, Z_M)$ in the sense that each axis of coordinate systems $(x_i, y_i, z_i)$ is orthogonal to two axes of base coordinate system $(X_M, Y_M, Z_M)$. In addition, each of coordinate system $(x_i, y_i, z_i)$ is illustrated in FIG. 4 as having a Z-axis which is aligned with the $X_M$, $Y_M$ and $Z_M$ axes of the base coordinate system, respectively. Moreover, each of coordinate systems $(x_i, y_i, z_i)$ has an origin displaced a distance $d_0$ from the origin of base coordinate system $(X_M, Y_M, Z_M)$.

Figure 7:
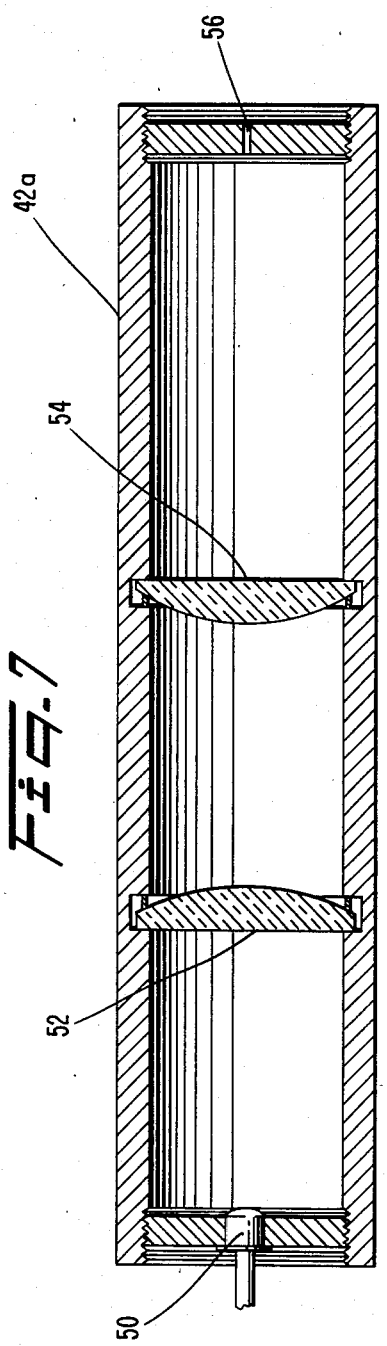
FIG. 7 is a side view of a light source suitable for use in connection with the detector of FIG. 3.

Using coordinate systems $(x_i, y_i, z_i)$ of planar surfaces 32, 34 and 36, the position and orientation of detectors 38, 40 and 42 and light sources 42a, 42b, 44a, 44b, and 46a, 46b may be explained with reference to FIGS. 5a, 5b, and 6. Specifically, as shown in these figures, each position detector 38, 40 and 42 is aligned to lie in the XY plane of a respective coordinate system $(x_i, y_i, z_i)$ and is positioned to have its center located approximately at the origin of that coordinate system. In addition, each pair of light sources 42a, 42b, 44a, 44b and 46a, 46b is positioned along the X and Y axes a distance $X_e$ and $Y_e$ from the origin of the respective $(x_i, y_i, z_i)$ coordinate systems. For example, as shown in FIG. 5a and FIG. 6, light source 44a is located a distance $X_e$ from the origin or coordinate system $(x_2, y_2, z_2)$ and in FIGS. 5b and 6 a light source 44b is shown positioned along the Y axis a distance $Y_e$ from the origin of coordinate system $(x_2, y_2, z_2)$. As may also be seen in FIGS. 5a, 5b and 6, each of the light sources is aligned an angle $\theta_B$ from normal to the corresponding position sensor surface to intersect the Z axis of corresponding $(x_i, y_i, z_i)$ coordinate system at $(0, 0, z_m)$. Light sources 42a, 42b, 44a, 44b and 46a, 46b preferably are attached to a light emitting diode (LED)-coupler arrangement as shown in FIG. 7. The LED-coupler is used to couple light into a fiber cable which carries the light to a collimator lens comprising light sources 42a, 42b, 44a, 44b, 46a, 46b. Specifically, the LED-coupler coupled to light source 44a is illustrated in FIG. 7 as including an LED 50, lenses 52 and 54, and an optical fiber 56. Collimator lenses comprising light sources 42a, 42b, 44a, 44b, 46a, 46b are preferably commercially available SELFOC lenses which have a beam collimation error of less than one degree.

It is also preferable that angle $\theta_B$ of FIGS. 5a, 5b and 6 be approximately 37 degrees.

As is illustrated in FIG. 6, a Light Beam No. 1 from light source 44a is directed toward a surface 14 of target cube 10 and is reflected from that surface back to position sensitive detector 40, striking detector 40 at a location $(x_{r1}, y_{r1})$. Likewise, light source 44b provides a Light Beam No. 2 which strikes surface 14 of cube 10 and is thereby reflected back to position sensor detector 40, striking position sensitive detector 40 at a location $(x_{r2}, y_{r2})$. It should be understood that similar reflections occur with regard to light sources 42a and 42b off of surface 12 and from light sources 46a, 46b off reflective surface 16 of target cube 10 to provide corresponding reflection positions $(x_{r1}, y_{r1})$ and $(x_{r2}, y_{r2})$ for each of position sensitive detectors 38, 40, 42.

In accordance with the present invention, a mechanism and corresponding method is provided for determining the POSE of a target as a function of the reflection positions determined by the position sensitive detectors of the subject invention. In order to fully appreciate the mechanism and method involved, the mathematics involved will be set forth below.

Specifically, the following mathematical discussion begins with a determination of the direction cosines of a face of the target cube, continues with a determination of the distance from such a face to the hollow cube detector fixture and concludes with an analysis of the relative POSE of the target cube in relationship to the POSE of the base as defined by the detector base coordinate system $(X_M, Y_M, Z_M)$. Although the following mathematical analysis is provided in order to provide a more complete understanding of the subject invention, it should be understood that this analysis is being provided by way of example and not limitation, it being understood that the basic principles disclosed by the following analysis may be presented and utilized through variations which come within the spirit and scope of applicant's invention.

DETERMINATION OF THE DIRECTION COSINES OF A FACE OF THE TARGET CUBE

A unit normal vector to a face of target cube 10 is written in face coordinates as:

$$\hat{b} = b_x\hat{x} + b_y\hat{y} + b_z\hat{z} \qquad \text{Equation (1)}$$

Figure 8:
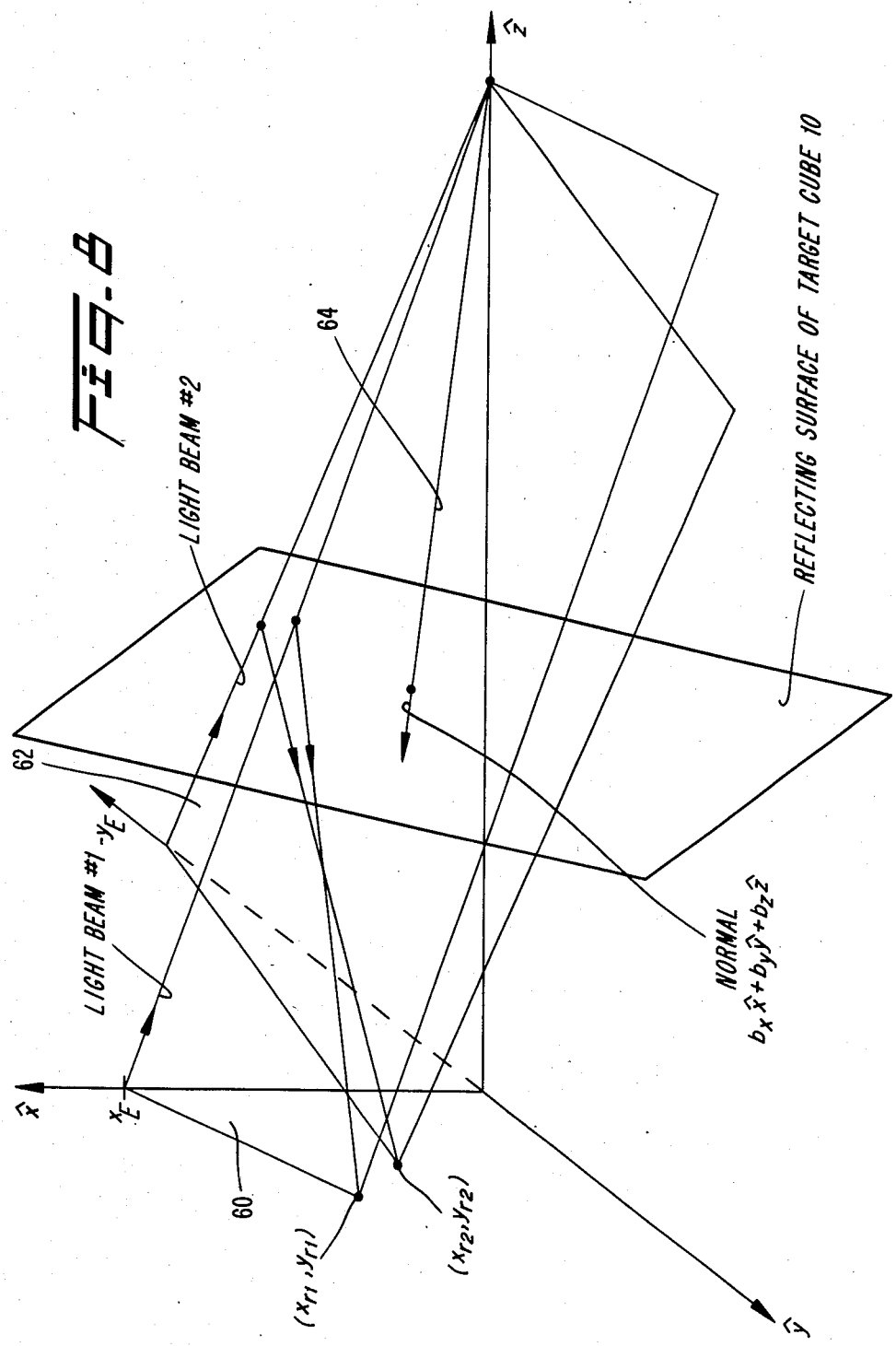
FIG. 8 illustrates the geometric relationship between the light beams of the detector of FIG. 3 reflected from a target cube of FIGS. 1 and 2.

Coefficients $b_x$, $b_y$ and $b_z$ are the direction cosines of the plane. The direction cosines are easily determined by observing in FIG. 8 that the plane 60 passing through the points $(x_e, 0, 0)$, $(0, 0, z_m)$ and $(x_{r1}, y_{r1}, 0)$ and the plane 62 passing through the points $(0, -y_e, 0)$ $(0, 0, z_m)$ and $(x_{r2}, y_{r2}, 0)$ iintersect in a line 64 which is normal to the corresponding surface of target cube 10.

The points $(x_e, 0, 0)$, $(0, 0, z_m)$ and $(x_{r1}, y_{r1}, 0)$ determine the plane:

$$\frac{x}{x_e} + \left(\frac{x_e - x_{r1}}{x_e y_{r1}}\right) y + \frac{z}{z_m} = 1 \qquad \text{Equation (2)}$$

The points $(0, -y_e, 0)$, $(0, 0, z_m)$ and $(x_{r2}, y_{r2}, 0)$ determine the plane:

$$\left(\frac{y_e + y_{r1}}{y_e x_{r2}}\right) - \frac{y}{y_e} + \frac{z}{z_m} = 1 \qquad \text{Equation (3)}$$

The intersection of the planes given by Equations (2) and (3) is the line:

$$\frac{x}{b_x} = \frac{y}{b_y} = \frac{z}{b_z} \qquad \text{Equation (4)}$$

Where:

$$b_x = \frac{x_{r2}((y_{ri} + y_e) - y_e x_{r1i})}{b_{mag}} \qquad \text{Equation (5a)}$$

$$b_y = \frac{y_{r1}(y_e x_{r2} - y_{r2} x_e - x_e y_e)}{b_{mag}} \qquad \text{Equation (5b)}$$

$$b_z = \frac{z_m(-x_e(y_{r2} + y_e) + x_{r2}(y_{r2} - y_{r1}) + y_e x_{r1})}{b_{mag}} \qquad \text{Equation (5c)}$$

$$b_{mag} = (b_x^2 + b_y^2 + b_z^2)^{\frac{1}{2}} \qquad \text{Equation (5d)}$$

The direction cosines of the intersection line 64 (which are also the direction cosines of the normal to a face of target cube 10) are calculated using only the detected reflection position coordinates $(x_{r1}, y_{r1})$ and $(x_{r2}, y_{r2})$, and the geometric constants $x_e$, $y_e$ and $z_m$.

DETERMINATION OF THE DISTANCE TO A FACE OF THE TARGET CUBE

The distance of $d_F$ between a face of the target cube and a corresponding face of detector fixture 30, FIG. 3, along the z axis of a face coordinate system can be determined from the reflection position coordinates if the direction cosines of the normal to the target cube face are known. The position where a reflected beam falls on the position sensitive detector is written as a function of the orientation of the target cube face's normal and the distance, $d_F$ to the face. In the resulting expression, $d_F$ is the only unknown. Only one measured position is required to solve for $d_F$, so there are three more equations than are required. However, for computational reasons, as will be seen below, the equation resulting from one of the two reflected beam positions $x_{r1}$ or $y_{r2}$ is the best choice to solve for $d_F$. To determine where the reflected beam falls on a position sensitive detector, it is first necessary to determine the path of the light beam. The following analysis is presented for Light Beam No. 1 and the results for Light Beam No. 2 are also included. The equation of the emitted Light Beam No. 1 of FIG. 6 is:

$$(x - x_E) = -\tan z\, \theta_B \qquad (6)$$

The equation of the target cube face plane in the face coordinate frame in terms of the knowns $b_z, b_y, b_z$ and the unknown, $d_f$, is written as:

$$b_x x + b_y y + b_z(z - d_F) = 0 \qquad (7)$$

Coefficients $b_x$, $b_y$, $b_z$ are the direction cosines of the normal to the target cube face in the face coordinate system and x, y, z are the coordinates of the face coordinate system.

The intersection of Light Beam No. 1 of FIG. 6 with the face of the target cube is found by solving Equations (6) and (7) simultaneously and by using the face that the intersection occurs in the y=0 plane. The intersection point $(x_{F1}, y_{F1}, z_{F1})$ is given by:

$$z_{F1} = \frac{d_F b_z - b_x x_E}{b_z - b_x \tan\theta_B} \qquad \text{Equation (8a)}$$

$$x_{F1} = -z_{F1} \tan\theta_B + x_E \qquad (8b)$$

$$y_{F1} = 0 \qquad (8c)$$

Using the fact that the angle of incidence equals the angle of reflection, the direction cosines of the reflected beam $(v_{x1}, v_{y1}, v_{z1})$ can be found using a known method:

$$v_{x1} = (2\sin\theta_B) b_x^2 - (2\cos\theta_B) b_x b_z - \sin\theta_B \qquad (9a)$$

$$v_{y1} = (2\sin\theta_B) b_x b_y - (2\cos\theta_B) b_y b_z \qquad (9b)$$

$$v_{z1} = -(2\cos\theta_B) b_z^2 + (2\sin\theta_B) b_x b_z + \cos\theta_B \qquad (9c)$$

Using Equations (8a-c) and (9a-c), the equation of the reflected Light Beam No. 1 is found as:

$$\frac{x - x_{F1}}{v_{x1}} = \frac{y}{v_{y1}} = \frac{z - z_{F1}}{v_{z1}} \qquad \text{Equation (10)}$$

The intersection of the reflected beam with the z=0 plane (a position sensitive detector) is found by substituting z=0, $x = x_{r1}$ and $y = y_{r1}$ into Equation (10) resulting in:

$$x_{r1} = -z_{F1}\left(\frac{v_{x1}}{v_{z1}}\right) + x_{F1} \qquad \text{Equation (11a)}$$

$$y_{r1} = -z_{F1}\left(\frac{v_{y1}}{v_{z1}}\right) \qquad \text{Equation (11b)}$$

The reflection position coordinates $(x_{r1}, y_{r1})$ are measured by a position sensitive detector. Expressions similar to Equations (11a) and (11b) result for $x_{r2}$ and $y_{r2}$ when Light Beam No. 2 is used:

$$x_{r2} = -z_{F2}\left(\frac{v_{y2}}{v_{z2}}\right) \qquad \text{Equation (12a)}$$

$$y_{r2} = -z_{F2}\left(\frac{v_{y2}}{v_{z2}}\right) + y_{F2} \qquad \text{Equation (12b)}$$

where:

$$v_{x2} = -(2\sin\theta_B) b_x b_y - (2\cos\theta_B) b_x b_z \qquad (13a)$$

$$v_{y2} = -(2\sin\theta_B) b_y^2 - (2\cos\theta_B) b_y b_z + \sin\theta_B \qquad (13b)$$

$$v_{z2} = -(2\cos\theta_B) b_z^2 - (2\sin\theta_B) b_y b_z + \cos\theta_B \qquad (13c)$$

$$z_{F2} = \frac{d_F b_z + b_y y_E}{b_z + b_y \tan\theta_B} \quad \text{Equation (14a)}$$

$$y_{F2} = z_{F2} \tan\theta_B - y_E \quad (14b)$$

$$x_{F2} = 0 \quad (14c)$$

When Equations (8a-c) are substituted into Equation (11a) and the resulting equation is solved for $d_F$, the following expression results:

$$d_F = \frac{1}{b_z}\left\{ \frac{(b_z - b_x \tan\theta_B)(x_E - x_{r1})}{(v_{x1}/v_{z1}) + \tan\theta_B} + b_x x_E \right\} \quad \text{Equation (15)}$$

When Equations (8a-c) are substituted into Equation (11b) and the resulting equation is solved for $d_F$, the following expression results:

$$d_F = \frac{1}{b_z}\left\{ \frac{(-y_{r1} v_{z1})(b_z - b_x \tan\theta_B)}{v_{y1}} + x_e b_x \right\} \quad \text{Equation (16)}$$

When Equations (14a-c) are substituted into Equation (12a) and the resulting equation is solved for $d_F$, the following expression results:

$$d_F = \frac{1}{b_z}\left\{ \frac{(-x_{r2} v_{z2})(b_z + b_y \tan\theta_B)}{v_{x2}} + y_e b_x \right\} \quad \text{Equation (17)}$$

When Equations (14a-c) are substituted into Equation (12b) and the resulting equation is solved for $d_F$, the following expression results:

$$d_F = \frac{1}{b_z}\left\{ \frac{(b_z + b_y \tan\theta_B)(y_E + y_{r2})}{(v_{y2}/v_{z2}) - \tan\theta_B} + b_y y_E \right\} \quad \text{Equation (18)}$$

The preferred operating mode of the sensor of the subject invention is with the faces of the detector fixture 32 and the faces of the target cube 10 approximately parallel. Therefore the direction of the normal to the target cube faces are approximately parallel to a face coordinate system Z axis and the following conditions are valid:

$$|b_z| >> 0 \quad (19a)$$

$$|v_{z2}| >> 0 \quad (19b)$$

$$|v_{z2}| >> 0 \quad (19c)$$

But $v_{x1}$, $v_{y1}$, $v_{x2}$ and $v_{y2}$ are normally very small and could be zero. Thus, Equations (16) and (17) should not be used to solve for $d_F$ because division by zero could result.

Equation (15) can be used to solve for $d_F$ except when:

$$v_{x1}/v_{z1} = -\tan\theta_B \quad (20)$$

Equation (20) is satisfied only when the reflected beam lies in the plane formed by the line $x = x_E$ and the point $(0,0,z_m)$. A beam reflected in this manner is not incident on the position sensitive detector. Thus, Equation (15) is valid within the entire sensor range.

Equation (18) can be used to solve for $d_F$ except when:

$$v_{y2}/v_{z2} = -\tan\theta_B \quad (21)$$

Equation (21) is satisfied only when the reflected beam lies in the plane formed by the line $Y = -Y_E$ and the point $(0,0,z_m)$. A beam reflected in this manner is not incident on the position sensitive detector. Thus Equation (18) is valid within the entire sensor range.

Either Equation (15) or (18) can be used to solve for $d_F$. This redundancy is exploited by averaging the two solutions for $d_F$ to improve the accuracy of the sensor.

RELATIVE POSE OF THE TARGET CUBE

The direction cosines and the distances between the face of the target cube and the face of the detector fixture are used to write equations for the three faces of the target cube in the associated face coordinate frame. The three equations are transformed to the detector base frame and are used to determine the pose of the target cube relative to the detector base frame ($X_M$, $Y_M$, $Z_M$).

The relationship between each of the three target cube face coordinate systems ($x_i$, $y_i$, $z_i$) and the base coordinates ($x_M$, $y_M$, $z_M$) are known (see FIG. 4). These relationships are given in standard transformation matrix form by: Face #1:

$$\begin{vmatrix} x_M \\ y_M \\ x_M \\ 1 \end{vmatrix} = \begin{vmatrix} 0 & 0 & -1 & d_{01} \\ -1 & 0 & 0 & 0 \\ 0 & 1 & 0 & 0 \\ 0 & 0 & 0 & 1 \end{vmatrix} \begin{vmatrix} x_1 \\ y_1 \\ z_1 \\ 1 \end{vmatrix} \quad \text{Equation (22a)}$$

The direction cosines of the vector $\hat{n}$ in FIG. 1 ($n_x$, $n_y$, $n_z$) in base frame ($X_M$, $Y_M$, $Z_M$) are found by transforming the direction cosines of target face 12 ($b_{x1}$, $b_{y1}$, $b_{z1}$) to the base frame using Equation (22a):

$$n_x = -b_{z1} \quad (22b)$$

$$n_y = -b_{x1} \quad (22c)$$

$$n_z = b_{y1} \quad (22d)$$

Face #2:

$$\begin{vmatrix} x_M \\ y_M \\ z_M \\ 1 \end{vmatrix} = \begin{vmatrix} 0 & 1 & 0 & 0 \\ 0 & 0 & -1 & d_{02} \\ -1 & 0 & 0 & 0 \\ 0 & 0 & 0 & 1 \end{vmatrix} \begin{vmatrix} x_2 \\ y_2 \\ z_2 \\ 1 \end{vmatrix} \quad \text{Equation (23a)}$$

The direction cosines of the vector $\hat{s}$ in FIG. 1 ($s_x$, $s_y$, $s_z$) in base frame ($X_M$, $Y_M$, $Z_M$) are found by transforming the direction cosines ($b_{x2}$, $b_{y2}$, $b_{z2}$) of target face 14 to the base frame using Equation (23a):

$$s_x = b_{y2} \quad (23b)$$

$$x_y = -b_{z2} \quad (23c)$$

$$s_z = -b_{x2} \quad (23d)$$

Face #3:

$$\begin{vmatrix} x_M \\ y_m \\ z_M \\ 1 \end{vmatrix} = \begin{vmatrix} -1 & 0 & 0 & 0 \\ 0 & 1 & 0 & 0 \\ 0 & 0 & -1 & d_{03} \\ 0 & 0 & 0 & 1 \end{vmatrix} \begin{vmatrix} x_3 \\ y_3 \\ z_3 \\ 1 \end{vmatrix}$$ Equation (24a)

The direction cosines of the vector $\hat{a}$ in FIG. 1 ($a_x$, $a_y$, $a_z$) in base frame ($X_M$, $Y_M$, $Z_M$) are found by transforming the direction cosines of target face 16 ($b_{x3}$, $b_{y3}$, $b_{z3}$) to the base frame using Equation (24a):

$$a_x = -b_{x3} \quad (24b)$$

$$a_y = b_{y3} \quad (24c)$$

$$a_z = -b_{z3} \quad (24d)$$

In the above equations $d_{oi}$ is the distance from each face of the detection fixture to the detection mixture frame origin. A practical choice is to make $d_{oi}$ all equal to a fixed value $d_o$.

By using the relationships expressed in Equations (22a-d), (23a-d) and (24a-d), the equation of each of the target cube fixture faces expressed by Equation (7) are written in the detector fixture frame as:

Face 12:

$$n_x(x_M - d_o + d_{F1}) + n_y y_M + n_z z_M = 0 \quad (25a)$$

Face 14:

$$s_x x_M + s_y(y_M - d_o + d_{F2}) + s_z z_M = 0 \quad (25b)$$

Face 16:

$$a_x x_M + a_y y_M + a_z(z_M - d_o + d_{F3}) = 0 \quad (25c)$$

The intersection of these three planes is found by solving Equations (25a-c) simultaneously. The intersection point ($_cx_M$, $_cy_M$, $_cz_M$), and therefore the position vector of the corner C of the targer cube, is given in the base detector frame by:

$$\vec{p}_{oc} = {_cx_M}\hat{x}_M + {_cy_M}\hat{y}_M + {_cz_M}\hat{z}_M \quad \text{Equation (26a)}$$

Where:

$$_cx_M = \frac{L(s_y a_z - a_y s_z) + M(a_y n_z - n_y a_z) + N(n_y s_z - s_y n_z)}{DET} \quad \text{Equation (26b)}$$

$$_cy_M = \frac{L(s_z a_x - a_z s_x) + M(a_z n_x - n_z a_x) + N(n_z s_x - s_z n_x)}{DET} \quad \text{Equation (26c)}$$

$$_cz_M = \frac{L(s_x a_y - a_x s_y) + M(a_x n_y - n_x a_y) + N(n_x s_y - s_x n_y)}{DET} \quad \text{Equation (26d)}$$

$$DET = n_x(s_y a_z - a_y s_z) + n_y(a_x s_z - s_x a_z) + n_z(s_x a_y - a_x s_y) \quad (26e)$$

$$L = n_x(d_o - d_{F1}) \quad (26f)$$

$$M = s_y(d_o - d_{F2}) \quad (26g)$$

$$N = a_z(d_o - d_{F3}) \quad (26h)$$

The position of the target cube frame origin (see FIG. 1) is given by:

$$\vec{p}_{OH} = \vec{p}_{OC} - \vec{p}_{HC} = {_px_M}\hat{x}_M + {_py_M}\hat{y}_M + {_pz_M}\hat{z}_M \quad \text{Equation (27)}$$

where:

$$\vec{p}_{HC} = \frac{H}{2}((n_x + s_x + a_x)\hat{x}_M + (n_y + s_y + a_y)\hat{y}_M + (n_z + s_z + a_z)\hat{z}_M) \quad \text{Equation (28)}$$

Substituting Equations (28) and (26a) into Equation (27) gives the expressions for $_px_M$, $_py_M$ and $_pz_M$ in the detector fixture frame:

$$_px_M = {_cx_M} - \frac{H}{2}(n_x + s_x + a_x) \quad \text{Equation (29a)}$$

$$_py_M = {_cy_M} - \frac{H}{2}(n_y + s_y + a_y) \quad \text{Equation (29b)}$$

$$_pz_M = {_cz_M} - \frac{H}{2}(n_z + s_z + a_z) \quad \text{Equation (29c)}$$

The POSE of the target cube frame coordinate system ($x_h, y_h, z_h$) oriented with the $\hat{n}$, $\hat{s}$, $\hat{a}$ vectors and positioned at the center of the target cube in FIG. 1, relative to the detection fixture frame is described by the following homogeneous transformation:

$$\begin{vmatrix} x_M \\ y_M \\ z_M \\ 1 \end{vmatrix} = \begin{vmatrix} n_x & s_x & a_x & _px_M \\ n_y & s_y & a_y & _py_M \\ n_z & s_z & a_z & _pz_M \\ 0 & 0 & 0 & 1 \end{vmatrix} \begin{vmatrix} x_h \\ y_h \\ z_h \\ 1 \end{vmatrix} \quad \text{Equation (30)}$$

The 4×4 homogeneous transformation matrix in Equation (30) contains all the information specifying the POSE of the target cube. The 3×3 upper left submatrix specifies the target cube's orientation and the 3X1 upper right submatrix specifies the position of the target cube. Equation (30) is used to express a vector written in the target cube coordinates ($X_h, Y_h, Z_h$) in the detector base frame ($X_M, Y_M, Z_M$).

In Equation (30) $n_x$, $n_y$, and $n_z$ are given by equations (22b-d), $s_x$, $s_y$, and $s_z$ are given by Equations (23b-d), $a_x$, $a_y$, and $a_z$ are given by Equations (24b-d) and $_px_M$, $_py_M$, and $_pz_M$ are given by Equations (29a-c).

In the description of the sensor presented so far, it has been assumed that the light beams are mounted at exactly ($x_e$,0,0) and (0,$y_e$,0) and aimed exactly at angle $\theta_B$. However, when a sensor in accordance with the present invention is machined at a reasonable cost, large tolerances are inherently employed and, as a consequence, the position of the beams and their alignments are not exactly the design parameters. Accordingly, a calibration procedure is required to determine the exact beam positions and alignments. Also, the position sensitive detectors may not necessarily be mounted precisely on the detector fixture face with the exact orientation as the face and may not be mounted exactly at the desired position. Accordingly, a calibration procedure may be required to determine these orientation and position errors as well.

A description of this calibration procedure follows.

Figure 9:
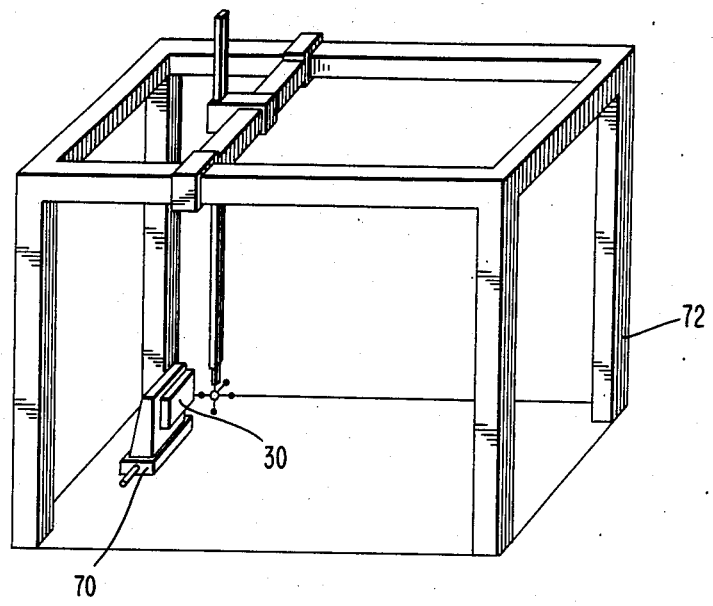
FIG. 9 is a perspective view of a coordinate measuring machine employed to calibrate the sensor of the subject invention.

Each surface 32, 34, 36 of detector fixture 30 (FIG. 2) is preferably finely machined by a numerical control machine so that the three surfaces of detector fixture 30 can be used to establish the orientation and position of each surface of detector fixture 30 using a conventional coordinate measuring machine. To obtain the orientation and position of each such surface, detector fixture 30 is mounted on a six degree of freedom kinematic fixture 70 of a conventional coordinate measuring machine 72 as shown in FIG. 9. The equations of each of the three surfaces of the plate making up each of planar surfaces 32, 34 and 36 of detector fixture 30 are found by physically contacting each of those surfaces with the probe of a conventional coordinate measuring machine. Thus, the face coordinate system $(x_i, y_i, z_i)$ of each surface of detection fixture 30 may be obtained (see FIG. 10). As should be apparent to one skilled in the art, this procedure establishes the reference coordinate system on each surface of detector fixture 30. This procedure actually establishes a reference coordinate system at the corner of each surface 32 of detector fixture 30. However, this coordinate system may be readily translated as shown in FIG. 10 to the center of each position detector, such as is illustrated for position detector 38 in FIG. 10.

Figure 10:
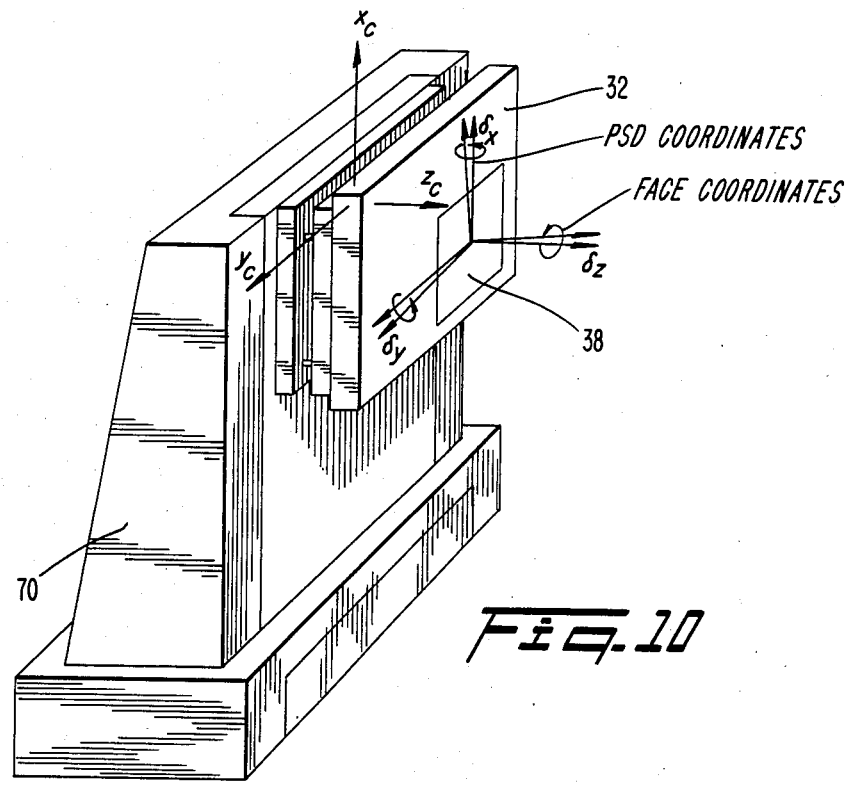
FIG. 10 illustrates the positioning of one plate of the detector fixture of FIG. 3 in the work space of a conventional coordinate measuring machine for calibration purposes using a six degree of freedom kinematic mount.

A coordinate system is associated with each position sensitive detector as illustrated in FIG. 10 by PSD coordinates which are disoriented from the detector fixture face coordinates as is also illustrated in FIG. 10. The PSD coordinate system origin may be considered located at the origin of the face coordinate system. A conventional coordinate measuring machine may be used to determine the orientation of the PSD coordinate system with respect to the face coordinate system and thereby determine the requisite transformation required between the face coordinates and the PSD coordinates. During operation of a position sensor, beam position is determined in the PSD coordinates and the transformation between PSD coordinates and the face coordinates may be used to derive the beam position in face coordinates.

The position sensors of the subject invention are preferably designed for position accuracy of at least $10^{-4}$ inches and an orientation accuracy of at least $10^{-4}$ radians. Conventional position sensitive detectors can achieve a position resolution well below $10^{-4}$ inches, but conventional position sensitive detectors are not accurate to $10^{-4}$ inches due to non-linearity. To overcome this negative effect of non-linearity, the plot of position accuracy is recommended.

Figure 12:
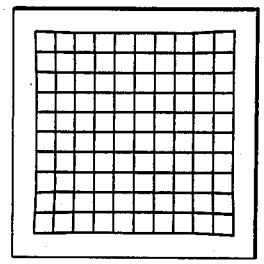
FIG. 12 is a position accuracy plot for a position sensitive device which is more accurate than the device corresponding to the plot of FIG. 11.
Figure 11:
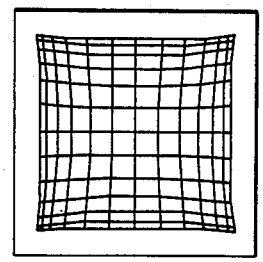
FIG. 11 is a position accuracy plot for a position sensitive device which may be utilized in accordance with the teachings of the subject convention.

For example, a position accuracy plot of a Hamamatsu S1200 is illustrated in FIG. 11. A position accuracy plot for a more sophisticated and, hence, more expensive position sensitive detector, such as the Hamamatsu S1880, is illustrated in FIG. 12. In either case, a map of output versus actual beam position is preferably determined and stored in a memory in order to meet the intended accuracy requirement of $10^{-4}$ inches and $10^{-4}$ radians. It should be understood that position resolution of position sensitive detectors utilized in accordance with the subject invention is more important than position accuracy because the accuracy can be improved through calibration while the resolution limits the maximum theoretical accuracy obtainable.

A map of output versus actual beam position may be determined by the calibration set up illustrated in FIG. 13. In FIG. 13 a collimated light source 90 is illustrated as being mounted on a kinematic fixture 92 of a conventional coordinate measuring machine. A position sensitive detector 94 employed in accordance with the teachings of the subject invention is shown mounted on a planar surface of a detector fixture of the subject invention which, in turn, is mounted on a kinematic fixture 96 of a conventional coordinate measuring machine. Light source 90 has a cube 98 mounted to an external surface thereof. As should be understood by those skilled in the art, the exact position and alignment of a collimated beam produced by light source 90 may readily be determined using conventional methodology with regard to the position and orientation of cube 98.

During calibration, the set up of FIG. 13 is employed to direct the output beam from light source 90 at a known position and orientation. Position sensor 94 is then moved through a sequence of known positions so that a grid of output versus actual beam position in terms of the face coordinate system of sensor 94 is measured. It should be understood that it is not critical if the center of the PSD of sensor 94 is exactly placed at the center of the face coordinate system of the corresponding detector fixture because misalignment errors may be eliminated through calibration in accordance with the set up of FIG. 13.

Figure 14A:
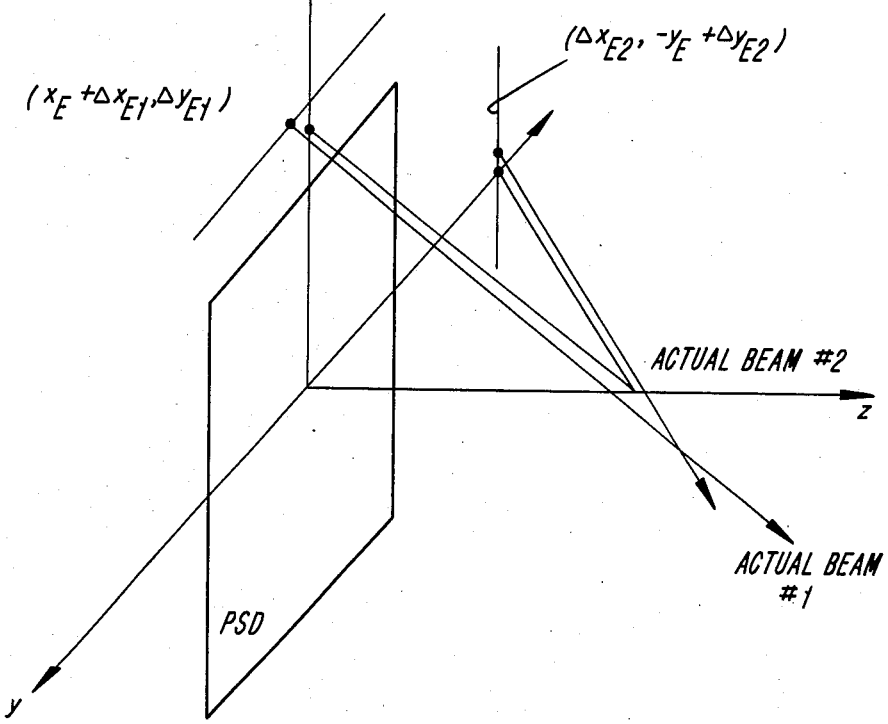
FIGS. 14a-c illustrate light source alignment errors.
Figures 14B, 14C:
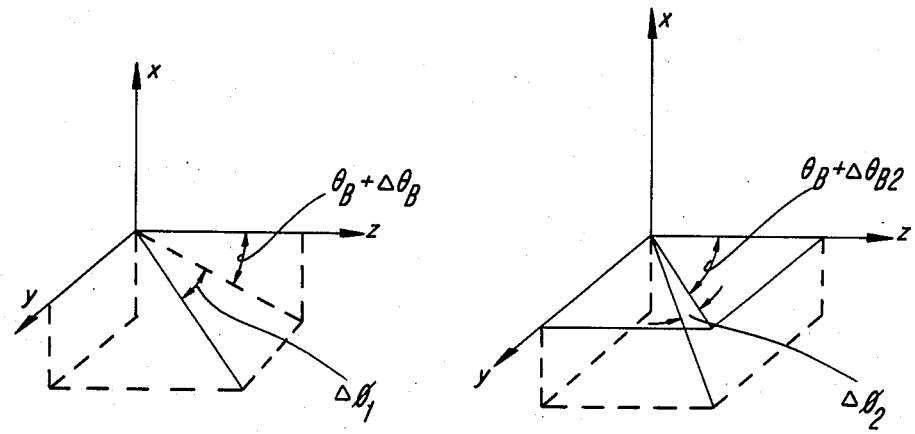

It is presently anticipated that the position and alignment of light sources used in accordance with the subject invention may have tolerances on the order of $10^{-2}$ inches and 0.05 degrees, since these tolerances can presently easily be met using inexpensive machining methods. However, with these relaxed tolerances, the resultant beams will not be positioned and aligned exactly as designed. Instead, position and alignment errors may be introduced. For example, as illustrated in FIGS. 14a-c each light source positioned along an X axis of a face coordinate system may actually be located at a position $(x_E + \Delta x_E, \Delta y_{e1}, 0)$ instead of $(x_E, 0, 0)$. Likewise, each light source located along a Y axis may actually be positioned at $(\Delta x_{E2}, -y_E + \Delta y_{E2}, 0)$ instead of $(0, -y_E, 0)$. Moreover, as is illustrated in FIGS. 14b and c, each light source for Beam #1 may be oriented at an angle $\theta_B + \Delta \theta_{B1}$, in the XZ plane instead of $\theta_B$ and each light source for Beam #2 may be oriented at an angle $\theta_B + \Delta \theta_{b2}$ in the YZ plane. Additionally, each beam may be oriented out of the XZ plane, or YZ plane at an angle $\Delta \phi_1$ or $\Delta \phi_2$ instead of being positioned precisely in the XZ plane or YZ plane.

The position errors $\Delta x_{E1}$, $\Delta y_{E1}$, $\Delta x_{E2}$, and $\Delta y_{E2}$, and the alignment errors $\Delta \theta_{B1}$, $\Delta \phi_1$, $\Delta \theta_{B2}$, and $\Delta \phi_2$, may be determined in accordance with the following procedure which is set forth with regard to Light Beam No. 1, it being understood that the procedure for Light Beam No. 2 is identical.

First, the actual equation is written for each beam. This equation includes the effects of beam positioning and alignment errors. All equations which follow are written in PSD coordinates. The actual equation for Light Beam No. 1 is:

$$\frac{x - x_E - \Delta x_{E1}}{p_{x1}} = \frac{y - \Delta y_{E1}}{p_{y1}} = \frac{z}{p_{z1}} \qquad \text{Equation (31)}$$

Where:

$$p_{x1} = -c\Delta\phi_1 s(\theta_{B1} + \Delta\theta_{B1}) \qquad \text{Equation (32a)}$$

$$p_{y1} = s\Delta\phi_1 \qquad \text{Equation (32b)}$$

$$p_{z1} = c\Delta\phi_1 c(\theta_{B1} + \Delta\theta_{B1}) \qquad \text{Equation (32c)}$$

The equation of the plane of the reflecting target cube is determined by the coordinate measuring machine and therefore $b_x$, $b_y$, $b_z$ and $d_F$ are known:

$$b_x x + b_y y + b_z(z - d_F) = 0 \tag{33}$$

The intersection of the beam with the plane of the target cube is given by:

$$x_{F1} = \frac{\left\{\frac{p_{z1}}{p_{x1}} b_z + \frac{p_{y1}}{p_{x1}} b_y\right\}(x_E + \Delta x_{E1}) + b_z d_F - b_y \Delta y_{E1}}{\{b_x + b_y(p_{y1}/p_{x1}) + b_z(p_{z1}/p_{x1})\}} \tag{34a}$$

$$y_{F1} = \frac{p_{y1}(b_z d_F - b_x(x_E + \Delta x_{E1})) + \Delta y_{E1}(b_z p_{z1} + p_{x1} b_x)}{(b_x p_{x1} + b_y p_{y1} + b_z p_{z1})} \tag{34b}$$

$$z_{F1} = \frac{b_z d_F - b_x(x_E + \Delta x_{E1}) - b_y \Delta y_{E1}}{\{b_x(p_{x1}/p_{z1}) + b_y(p_{y1}/p_{z1}) + b_z\}} \tag{34c}$$

The reflected beam equation is given by:

$$\frac{x - x_{F1}}{v_{x1}} = \frac{y - y_{F1}}{v_{y1}} = \frac{z - z_{F1}}{v_{z1}} \tag{35}$$

Where $v_{x1}$, $v_{y1}$ and $v_{z1}$ are determined by a conventional method as:

$$v_{x1} = 2b_x^2 c_a s_b - 2b_x b_z c_a c_b - 2b_x b_y s_a - c_a s_b \tag{36a}$$

$$v_{y1} = 2b_x b_y c_a s_b - 2b_y b_z c_a c_b - 2b_y^2 s_a + s_a \tag{36b}$$

$$v_{z1} = 2b_x b_z c_a s_b - 2b_y b_z s_a - 2b_z^2 c_a c_b + c_a c_b \tag{36c}$$

Where:

$$s_a = \sin \Delta \phi_1 \tag{37a}$$

$$c_a = \cos \Delta \phi_1 \tag{37b}$$

$$s_b = \sin(\theta_{B1} + \Delta \theta_{B1}) \tag{37c}$$

$$c_b = \cos(\theta_{B1} + \Delta \theta_{B1}) \tag{37d}$$

Note that if $\Delta \phi_1$ and $\Delta \theta_{B1}$ are zero (perfect alignment), Equations (36a–c) reduce to Equations (9a–c) and also if $\Delta Y_{E1}$ and $\Delta X_{E1}$ are zero (perfect positioning), then Equation (35) reduces to Equation (10).

The reflected beam falls on the PSD at:

$$x_{r1} = -z_{F1}\left(\frac{v_{x1}}{v_{z1}}\right) + x_{F1} \tag{38a}$$

$$y_{r1} = -z_{F1}\left(\frac{v_{y1}}{v_{z1}}\right) + y_{F1} \tag{38b}$$

$$z_{r1} = 0 \tag{38c}$$

The reflecting face is placed at two positions and orientations which are measured by a conventional coordinate measuring machine so that $b_x$, $b_y$, $b_z$ and $d_F$ are known. At each position the reflected beam position is measured. The measured values are denoted by $_M x_{r1i}$ and $_M y_{r1i}$ (i = 1,2). The beam positions are also calculated by using Equations (38a–b) with $\Delta x_{E1}$, $\Delta y_{E1}$, $\Delta \phi_1$ and $\Delta \theta_{B1}$ equal to zero. These values are denoted by $_C x_{r1i}$ and $_C y_{r1i}$ (i = 1,2). The error between $_M x_{r1i}$ and $_C x_{r1i}$ and $_M y_{r1i}$ and $_C y_{r1i}$ are due to the positioning and alignment errors $\Delta x_{E1}$, $\Delta y_{E1}$, $\Delta \phi_1$ and $\Delta \theta_{B1}$.

The analytical expressions for $_C x_{r1i}$ and $_C y_{r1i}$ are linearized at the measurement point and the following system of equations is solved for $\Delta x_{E1}$, $\Delta y_{E1}$, $\Delta \phi_1$ and $\Delta \theta_{B1}$:

$$\begin{bmatrix} \Delta x_{r11} \\ \Delta x_{r12} \\ \Delta y_{r11} \\ \Delta y_{r12} \end{bmatrix} = \begin{bmatrix} a_{11} & a_{12} & a_{13} & a_{14} \\ a_{21} & a_{22} & a_{23} & a_{24} \\ b_{31} & b_{32} & b_{33} & b_{34} \\ b_{41} & b_{42} & b_{43} & b_{44} \end{bmatrix} \begin{bmatrix} \Delta y_{E1} \\ \Delta x_{E1} \\ \Delta \phi_1 \\ \Delta \theta_{B1} \end{bmatrix} \tag{39}$$

where:

$$\Delta x_{r1i} = {}_M x_{r1i} - {}_C x_{r1i} \tag{40}$$

$$a_{i1} = \left.\frac{\partial x_{r1i}}{\partial \Delta y_{E1}}\right|_{\text{nom + corr.}} \tag{41a}$$

$$a_{i2} = \left.\frac{\partial x_{r1i}}{\partial \Delta x_{E1}}\right|_{\text{nom + corr.}} \tag{41b}$$

$$a_{i3} = \left.\frac{\partial x_{r1i}}{\partial \Delta \phi_1}\right|_{\text{nom + corr.}} \tag{41c}$$

$$a_{i4} = \left.\frac{\partial x_{r1i}}{\partial \Delta \theta_{B1}}\right|_{\text{nom + corr.}} \tag{41d}$$

$$\Delta y_{r1i} = {}_M y_{r1i} - {}_C y_{r1i} \tag{42}$$

$$b_{i1} = \left.\frac{\partial y_{r1i}}{\partial \Delta y_{E1}}\right|_{\text{nom + corr.}} \tag{43a}$$

$$b_{i2} = \left.\frac{\partial y_{r1i}}{\partial \Delta x_{E1}}\right|_{\text{nom + corr.}} \tag{43b}$$

$$b_{i3} = \left.\frac{\partial y_{r1i}}{\partial \Delta \phi_1}\right|_{\text{nom + corr.}} \tag{43c}$$

$$b_{i4} = \left.\frac{\partial y_{r1i}}{\partial \Delta \theta_{B1}}\right|_{\text{nom + corr.}} \tag{43d}$$

Since Equations (38a–c) are actually highly non-linear functions of the beam positioning and alignment errors, several iterations of the above procedure are necessary. At the start of the initial iteration $\Delta x_{E1}$, $\Delta y_{E1}$, $\Delta \phi_1$ and $\Delta \theta_{B1}$ are zero and $y_{E1}$, $x_{E1}$, $\phi_1$ and $\theta_{B1}$ are set to their nominal values. At the end of each iteration the beam position and alignment parameters are updated:

$$y_{E1} \rightarrow y_{E1} + \Delta y_{E1} \tag{44a}$$

$$x_{E1} \rightarrow x_{E1} + \Delta x_{E1} \tag{44b}$$

$$\phi_1 \rightarrow \phi_1 + \Delta \phi_1 \tag{44c}$$

$$\theta_{B1} \rightarrow \theta_{B1} + \Delta \theta_{B1} \tag{44d}$$

During sensor operation, the effects of the beam positioning and alignment errors will be taken into account by adjusting the values of $b_x$, $b_y$, $b_z$ and $d_F$ determined by the mathmatics described above in the section entitled "Determination of The Direction Cosines of a Face of the Target Cube." The previously developed mathematics will be used to determine the "nominal" solution to $b_x$, $b_y$, $b_z$ and $d_F$. The corrections in $b_x$, $b_y$, $b_z$ and $d_F$ due to machining tolerance errors are found by again using the exact ray tracing equations for $x_{r1}$, $y_{r1}$, $x_{r2}$ and $y_{r2}$. The following system of equations is solved for $\Delta b_x$, $\Delta b_y$, $\Delta b_z$ and $\Delta d_F$:

$$\begin{bmatrix} \Delta x_{r1} \\ \Delta x_{r2} \\ \Delta y_{r1} \\ \Delta y_{r2} \end{bmatrix} = \begin{bmatrix} a_{11} & a_{12} & a_{13} & a_{14} \\ a_{21} & a_{22} & a_{23} & a_{24} \\ c_{31} & c_{32} & c_{33} & c_{34} \\ c_{41} & c_{42} & c_{43} & c_{44} \end{bmatrix} \begin{bmatrix} \Delta b_x \\ \Delta b_y \\ \Delta b_z \\ \Delta d_F \end{bmatrix} \quad \text{Equation (45)}$$

Where:

$$\Delta x_{r1i} = M x_{r1i} - C x_{r1i} \quad (46)$$

$$a_{i1} = \left. \frac{\partial x_{r1i}}{\partial \Delta b_x} \right|_{nom + corr.} \quad \text{Equation (47a)}$$

$$a_{i2} = \left. \frac{\partial x_{r1i}}{\partial \Delta b_y} \right|_{nom + corr.} \quad \text{Equation (47b)}$$

$$a_{i3} = \left. \frac{\partial x_{r1i}}{\partial \Delta b_z} \right|_{nom + corr.} \quad \text{Equation (47c)}$$

$$a_{i4} = \left. \frac{\partial x_{r1i}}{\partial \Delta d_F} \right|_{nom + corr.} \quad \text{Equation (47d)}$$

$$\Delta y_{r1i} = M y_{r1i} - C y_{r1i} \quad \text{Equation (48)}$$

$$c_{i1} = \left. \frac{\partial y_{r1i}}{\partial \Delta b_x} \right|_{nom + corr.} \quad \text{Equation (49a)}$$

$$c_{i2} = \left. \frac{\partial y_{r1i}}{\partial \Delta b_y} \right|_{nom + corr.} \quad \text{Equation (49b)}$$

$$c_{i3} = \left. \frac{\partial y_{r1i}}{\partial \Delta b_z} \right|_{nom + corr.} \quad \text{Equation (49c)}$$

$$c_{i4} = \left. \frac{\partial y_{r1i}}{\partial \Delta d_F} \right|_{nom + corr.} \quad \text{Equation (49d)}$$

Again, several iterations are necessary to determine the final values of $b_x$, $b_y$, $b_z$ and $d_F$. At the end of each iteration the new values are found from:

$$b_x \rightarrow b_x + \Delta b_x \quad (50a)$$

$$b_y \rightarrow b_y + \Delta b_y \quad (50b)$$

$$b_z \rightarrow b_z + \Delta b_z \quad (50c)$$

$$d_F \rightarrow d_F + \Delta d_F \quad (50d)$$

The above set forth calibration steps provide a methodology for effectively and significantly increasing the orientation and position accuracy of a sensor incorporating the teachings of the subject invention while also making it inexpensive to construct.

Figure 15:
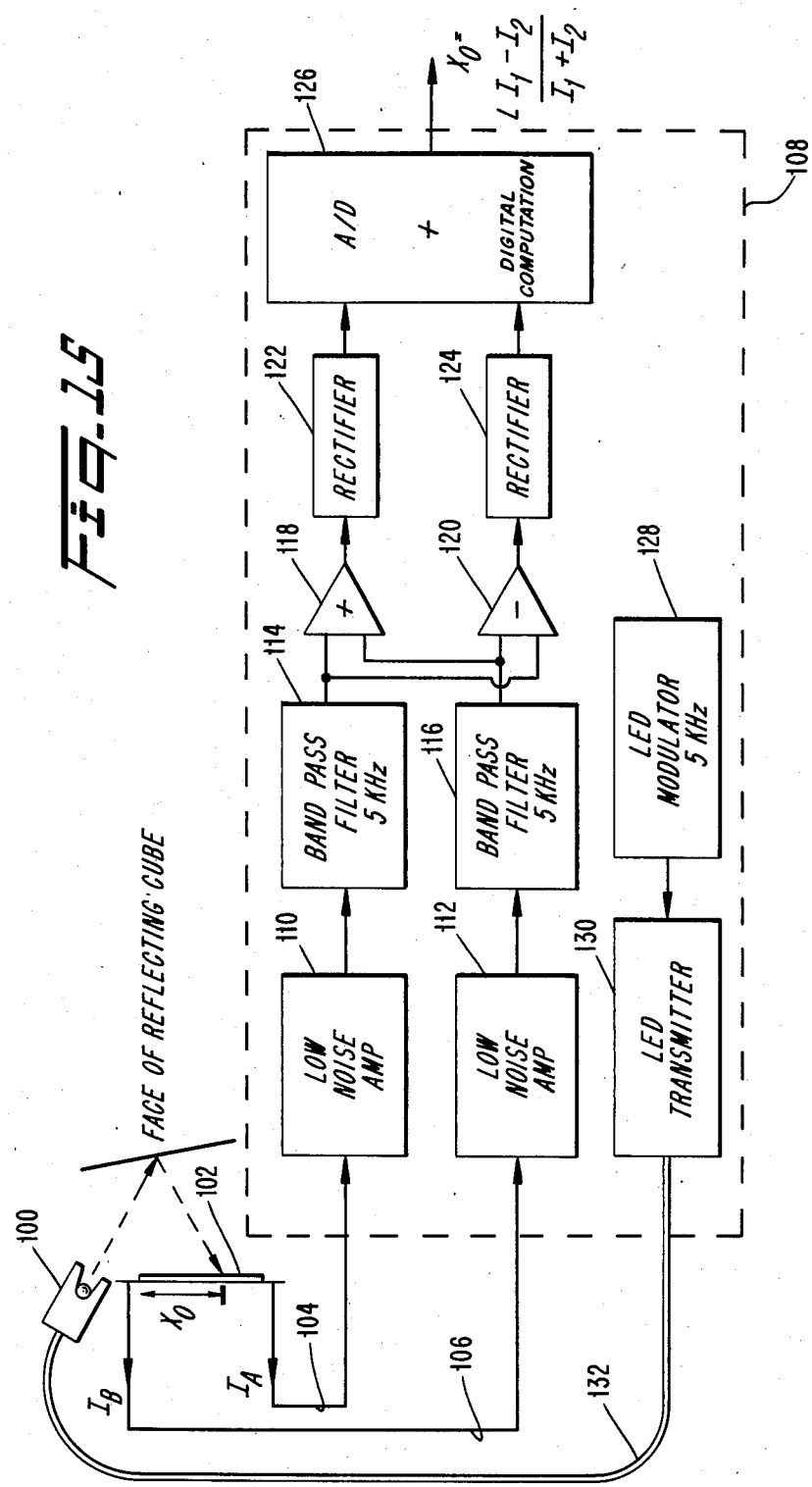
FIG. 15 is a block diagram of an illustrative circuit for the sensor of the subject invention.

FIG. 15 provides a block diagram of an electronic circuit which may be employed with a sensor built in accordance with the subject invention. Specifically, in FIG. 15 there is illustrated a representative light source 100 and representative position sensing detector 102 which has X coordinate outputs 104 and 106. An electronic system 108 is disclosed which includes low noise amplifiers 110, 112, band pass filters 114, 116, sum amplifier 118, difference amplifier 120, rectifiers 122, 124, analog-to-digital converter signal processor circuit 126, LED modulator 128, and LED transmitter 130.

As is illustrated in FIG. 15, the output 104 of position sensitive detector 102 is coupled to the input of low noise amplifier 110, the output of which is coupled to the input of band pass filter 114, the output of which is coupled to one input of sum amplifier 118 and to one input of difference amplifier 120. The output of sum amplifier 118 is coupled to the input of rectifier 122, the output of which in turn is coupled to an input of circuit 126. Likewise, output 106 of position sensitive detector 102 is coupled to an input of low noise amplifier 112, the output of which is coupled to the input of band pass filter 116, the output of which is coupled to one input of difference amplifier 120 and to one input of sum amplifier 118. The output of difference amplifier 120 is coupled to an input of rectifier 124, the output of which is, in turn, coupled to an input of circuit 126. Moreover, as is further illustrated in FIG. 15, the output of LED modulator 128 is coupled to the input of LED transmitter 130 which, in turn, is coupled through optical fiber 132 to light source 100.

In operation of the circuitry illustrated in FIG. 15, two currents $I_A$, $I_B$ are generated by detector 102 due to the 5 kHz modulated light reflected from light source 100. Currents $I_A$, $I_B$ are first amplified by low noise transimpedance amplifiers 110, 112. Next, these signals are filtered by 5 kHz band pass filters 114, 116 (200 Hz band width) to improve the signal-to-noise ratio. In the next stage of the circuit illustrated in FIG. 15, the numerator and denominator of equation 59 are determined by sum and difference amplifiers 118, 120. At this point, the sum and difference amplifiers are 5 KHz AC signals. These sum and difference signals are thereafter converted to signals with non-zero DC values by rectifiers 122, 124. Finally, A to D stage circuitry 126 converts the average DC analog values to digital values and the output of the difference circuitry is divided by the output of the sum circuitry to obtain the X position of the reflected light beam.

An integrating analog-to-digital converter is contemplated for certain sensor applications. An integrating analog-to-digital converter is a slow but highly accurate device. An integrating analog-to-digital converter is much less expensive than a successive approximation converter with the same accuracy. In situations where cost is more important than speed, the POSE sensor of the subject invention has natural application for an integrating analog-to-digital converter because accuracy requirements are anticipated to be on the order of 0.025%. In particular, a dual slope integrated analog-todigital converter is preferably contemplated because it offers the following advantages:

1. time is used to quantize the signal so there is an inherent accuracy and the differential linearity is small, there being no missing codes;
2. the accuracy of external components is non-critical;
3. there is excellent high-frequency noise reduction and there can be infinite 60 Hz rejection; and
4. the cost is low compared to successive approximation converters.

The dual slope converter has the following disadvantages:

1. it is a low speed device;
2. a highly accurate voltage reference is required;
3. a highly stable clock is required; and
4. a low leakage capacitor is required.

Figure 16:
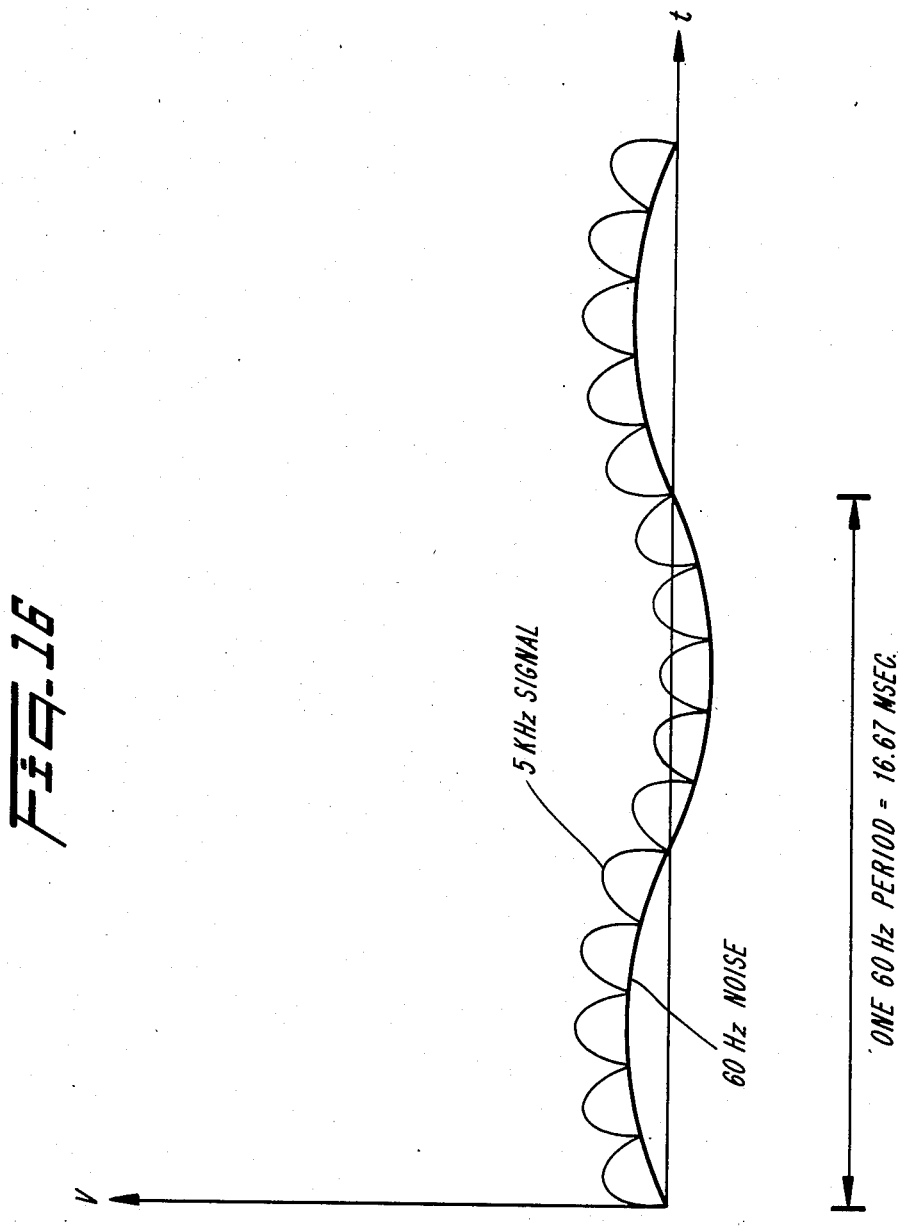
FIG. 16 illustrates the output of either the sum and difference stages of the circuit of FIG. 15.

On balance, the most important advantage appears at present to be that infinite 60 Hz rejection can be obtained. Infinite rejection of 60 Hz noise (and its harmonics and subharmonics) can be obtained by choosing the signal integration period to be an interger multiple of the 60 Hz period (16.67 m sec.). Preferably, the integration period is chosen to be three 60 Hz. The output of the sum and difference amplifiers 118 and 120 of FIG. 15 consists of a 5 KHz signal superimposed on a 60 Hz noise as is shown in FIG. 16. Other noise effects, such as transmitter oscillator noise, will also be reduced by averaging. In summary, using an integrating analog-to-digital converter allows less expensive components to be used elsewhere in the system. When the sensor is to be used to make fast POSE measurements, a successive approximation analog-to-digital converter will be used.

In accordance with the foregoing, a sensor is provided which accurately measures the POSE of a robot end effector or comparable target relative to a sensor base frame at a known POSE relative to the robot's base. This sensor is designed to determine the POSE of an end effector to an accuracy to $10^{-4}$ inches. The sensor has the capacity to work in an industrial environment and to be produced efficiently and economically.

It should be understood that although the object whose POSE is to be measured preferably carries the target cube and a base carries the detector fixture, these relationships may be reversed. Thus, the object may carry the detector fixture and the base may carry the target cube. It should also be understood that the base need not be stationary, but rather may be mobile. For example, the base may comprise the body of a mobile robot and the target cube may be on a different mobile robot.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of applicant's general inventive concept.

We claim:

1. A sensor for measuring the position and orientation (POSE) of an object relative to the POSE of a base, comprising:

(a) a target fixed to one of said object and base and including three mutually intersecting planar surfaces;

(b) means, coupled to the other of said object and said base, for directing a pair of light beams onto each of said planar surfaces; and (c) means, coupled to said other of said object and said base, for detecting the reflection positions of the resultant reflections of each of said light beams, said reflection positions thereby being available to determine the POSE of said object relative to the POSE of said base.

2. A sensor of claim 1 including means for determining the POSE of said object as a function of said reflection positions.

3. A sensor of claim 1 wherein said planes are mutually perpendicular to each other.

4. A sensor of claim 1 wherein said means for detecting includes three additional mutually perpendicular planar surfaces and a two-dimensional light position sensitive detector located on the inside-facing surface of each of said additional planar surfaces.

5. A sensor of claim 4 wherein said means for detecting comprises three pairs of light sources, with one pair mounted on each of said inside-facing surfaces of said additional planar surfaces.

6. A sensor of claim 5 wherein said light sources of each of said pairs are positioned on axes in said inside-facing surfaces orthogonal to each other and which have their origin at the center of the corresponding detector.

7. A sensor for measuring the position and orientation (POSE) of an object relative to a base, comprising:

(a) a target fixed to one of said object and said base and including first, second and third mutually perpendicular planes;

(b) light means, coupled to the other of said object and said base, said other of said object and base having a primary coordinate system $(X_M, Y_M, Z_M)$, for directing a pair of intersecting light beams onto each of said planar surfaces, said light means including first and second light sources corresponding to each of said first, second and third planes, the position of said light sources being definable by first, second and third coordinate systems which are orthogonal to said primary coordinate system, which each have their Z-axes aligned with said $X_M$, $Y_M$ and $Z_M$ axes of said primary coordinate system, respectively, which each have an origin displaced $d_0$ from the origin of said primary coordinate system, and with said light sources located at points $(x_E, 0, 0)$, $(0, y_E, 0)$, and with said light sources aligned to intersect the Z axis of said first, second and third coordinate systems at $(0, 0, z_M)$;

(d) detection means, coupled to said other of said object and said base, for detecting the reflection positions $(X_{r1}, Y_{r1})$ and $(X_{r2}, Y_{r2})$ of the resultant reflections of each of said light beams for each of said three planes, said detector means including a position sensitive detector located in each of the XY planes of said first, second, and third coordinate systems; and (e) means for determining the POSE of said object relative to the POSE of said base as a function of said reflection positions.

8. A sensor of claim 7 wherein $_cX_M$, $_cY_M$ and $_cZ_M$ define the location of the mutual point of intersection of said first, second and third planes relative to said primary coordinate system and wherein said means for determining includes means for calculating $_cX_M$, $_cY_M$ and $_cZ_M$ using the following relationships:

$$c^x{}_M = \frac{L(s_y a_z - a_y s_z) + M(a_y n_z - n_y a_z) + N(n_y s_z - s_y n_z)}{DET}$$

$$c^y{}_M = \frac{L(s_z a_x - a_z s_x) + M(a_z n_x - n_z a_x) + N(n_z s_x - s_z n_x)}{DET}$$

$$c^z{}_M = \frac{L(s_x a_y - a_x s_y) + M(a_x n_y - n_x a_y) + N(n_x s_y - s_x n_y)}{DET}$$

$$DET = n_x(s_y a_z - a_y s_z) + n_y(a_x s_z - s_x a_z) + n_z(s_x a_y - a_x s_y)$$

$$L = n_x(d_0 - d_{F1})$$

$$M = s_y(d_0 - d_{F2})$$

$$N = a_z(d_0 - d_{F3})$$

$$d_F = \frac{1}{b_z}\left\{\frac{(b_z - b_x\tan\theta_B)(x_E - x_{r1})}{(v_{x1}/v_{z1}) + \tan\theta_B} + b_x x_E\right\}$$

$$d_F = \frac{1}{b_z}\left\{\frac{(b_z + b_y\tan\theta_B)(y_E + y_{r2})}{(v_{y2}/v_{z2}) - \tan\theta_B} + b_y y_E\right\}$$

$$b_x = \frac{x_{r2i}(y_{ri} + y_e) - y_e x_{r1i}}{b_{mag}}$$

$$b_y = \frac{y_{r1i}(y_e x_{r2} - y_{r2i} x_e - x_e y_e)}{b_{mag}}$$

$$b_z = \frac{z_m(-x_e(y_{r2} + y_e) + x_{r2}(y_{r2} - y_{r1}) + y_e x_{r1})}{b_{mag}}$$

$$b_{mag} = (b_x^2 + b_y^2 + b_z^2)^{\frac{1}{2}}$$

$$\tan b = X_2/Z_M = y_E/Z_M \text{ Where: } X_E = Y_E$$

$$v_{x1} = (2\sin\theta_B)b_x^2 - (2\cos\theta_B)b_x b_z - \sin\theta_B$$

$$v_{z1} = -(2\cos\theta_B)b_z^2 + (2\sin\theta_B)b_x b_z + \cos\theta_B$$

$$v_{y2} = -(2\sin\theta_B)b_y^2 - (2\cos\theta_B)b_y b_z + \sin\theta_B$$

$$v_{z2} = -(2\cos\theta_B)b_z^2 - (2\sin\theta_B)b_y b_z + \cos\theta_B$$

$$\left.\begin{array}{l} n_x = -b_{z1} \\ n_y = -b_{x1} \\ n_z = b_{y1} \end{array}\right\} \text{For Coordinate System No. 1;}$$

$$\left.\begin{array}{l} s_x = b_{y2} \\ s_y = -b_{z2} \\ s_z = -b_{x2} \end{array}\right\} \text{For Coordinate System No. 2; and}$$

$$\left.\begin{array}{l} a_x = -b_{x3} \\ a_y = b_{y3} \\ a_z = -b_{z3} \end{array}\right\} \text{For coordinate System No. 3.}$$

9. A sensor of claim 8 wherein $\hat{n}$, $\hat{s}$ and $\hat{a}$ define the orientation of said first, second and third planes relative to said primary coordinate system, wherein:

$$n_x \hat{x}_M + n_y \hat{y}_M + n_z \hat{z}_M = \hat{n}$$

$$s_x \hat{x}_M + s_y \hat{y}_M + s_z \hat{z}_M = \hat{s}; \text{ and}$$

$$a_x \hat{x}_M + a_y \hat{y}_M + a_z \hat{z}_M = \hat{a}.$$

10. A method of measuring the position and orientation (POSE) of an object relative to the POSE of a base, comprising the steps of:
 (a) shining two light beams onto each of three mutually intersecting reflective planes fixed to one of said object and said base;
 (b) detecting the reflection positions of said light beams;
 (c) calculating the POSE of said object as a function of said reflective positions.

11. A method of claim 10 including the additional step of utilizing the outputs of a plurality of light position sensitive detectors during said step of detecting.

12. A method of claim 11 including the additional steps of:
 (a) calibrating said light sensitive position detectors prior to said step of utilizing by shining beams of light onto said detectors at known positions and obtaining error signals therefrom; and
 (b) modifying said outputs during said step of utilizing as a function of said error signals.

13. A method of claim 11 including the additional step of measuring the actual position and alignment of said light beams prior to said step of detecting by:
 (a) measuring the actual POSE of said reflective planes by utilizing a coordinate measuring technique;
 (b) measuring the actual reflection positions of said light beams with said reflecting planes in said measured POSE;
 (c) determining the expected reflection positions of said light beams with said reflecting planes in said measured POSE;
 (d) calculating the difference between said actual position and alignment of said light beams and the expected position and alignment of said light beams as a function of the difference between said actual reflection positions and said expected reflection positions; and
 (e) adjusting the result of said step of calculating as a function of the difference between said actual position and alignment of said light beams and said expected position and alignment of said light beams.

* * * * *